United States Patent
Batchelder et al.

(10) Patent No.: US 6,697,173 B2
(45) Date of Patent: Feb. 24, 2004

(54) WHITE REFERENCE CALIBRATION IN A DUAL DIGITIZER

(75) Inventors: Lee Batchelder, Derrey, NH (US); Richard Lehman, Nashua, NH (US)

(73) Assignee: Howtek Devices Corporation, Nashua, NH (US)

( * ) Notice: Subject to any disclaimer, the term of this patent is extended or adjusted under 35 U.S.C. 154(b) by 0 days.

(21) Appl. No.: 10/271,643

(22) Filed: Oct. 15, 2002

(65) Prior Publication Data

US 2003/0098999 A1 May 29, 2003

Related U.S. Application Data

(60) Provisional application No. 60/333,333, filed on Nov. 26, 2001.

(51) Int. Cl.[7] .............................. H04N 1/40; H04N 1/00; H04N 1/04; H01L 27/00
(52) U.S. Cl. ..................... 358/461; 358/474; 358/406; 250/208.1
(58) Field of Search ................................ 358/461, 474, 358/406; 250/208.1

(56) References Cited

U.S. PATENT DOCUMENTS

| | | | |
|---|---|---|---|
| 5,241,406 A | 8/1993 | Johnston et al. | 358/487 |
| 5,392,100 A * | 2/1995 | Yoshida | 399/211 |
| 5,892,590 A | 4/1999 | Ida et al. | 358/406 |
| 5,995,243 A | 11/1999 | Kerschner et al. | 358/461 |
| 6,023,348 A * | 2/2000 | Bosse et al. | 358/489 |

* cited by examiner

*Primary Examiner*—Edward Coles
*Assistant Examiner*—Houshang Safaipour
(74) *Attorney, Agent, or Firm*—Grossman, Tucker, Perreault & Pfleger, PLLC

(57) ABSTRACT

A dual digitizer for digitizing both transparent and reflective data mediums is provided where light from the reflective illuminator reflects off the transparent illuminator when the transparent illuminator is off to provide a white reference signal for use in calibrating the dual digitizer. A method of calibrating a dual digitizer for reflective scans includes: digitizing a transparent data medium; calibrating the dual digitizer to establish a white reference signal, the calibrating step including generating a light beam, reflecting a first portion of the light beam off a transparent illuminator, and utilizing the first portion of said light beam to establish the white reference signal; and digitizing a reflective data medium. The dual digitizer may be used in medical applications to digitize a transparent data medium such as an X-ray film.

18 Claims, 1 Drawing Sheet

WHITE REFERENCE CALIBRATION IN A DUAL DIGITIZER

CROSS-REFERENCE TO RELATED APPLICATIONS

The present application claims the benefit of the filing date of U.S. Provisional Application No. 60/333,333 filed Nov. 26, 2001, the teachings of which are incorporated herein by reference.

FIELD OF THE INVENTION

The present invention relates generally to a dual digitizer capable of digitizing both transparent and reflective data media, and in particular to establishing a white reference point before reflective scans in such dual digitizers.

BACKGROUND OF THE INVENTION

A dual digitizer that can digitize both transparent media, e.g., X-ray films and overheads, as well as reflective media, e.g., paper products, has been developed. Before a reflective scan of a reflective media takes place, such dual digitizers typically require some form of calibration to establish a white and black reference point. One method of doing this in a platen scanner is to provide a white reference strip either on the bottom or top of the platen, and usually at the start of the scan position. When calibration is required, the imaging apparatus moves under the white reference providing a representative white level signal across the width of the platen. The black calibration point can be established by turning off the reflective illuminator.

In a situation where the imaging apparatus is stationary and the data medium to be digitized is moved past an optical axis, a transparent illumination system typically provides little room for insertion of a white reference material. Some applications have remedied this by feeding some form of a white calibration sheet into the imaging apparatus for calibration. However, a user has to remember to insert such a white sheet before each reflective scan. This inevitably leads to human error as users forget this extra step. In addition, this extra step takes additional time to accomplish.

Accordingly, there is a need in the art for an alternative calibration technique for establishing a white reference level in a dual digitizer to overcome the above deficiencies in the prior art.

BRIEF SUMMARY OF THE INVENTION

A dual digitizer is configured to digitize a data medium, where the data medium is a transparent data medium or a reflective data medium, the digitizer consistent with the invention includes: a reflective illuminator configured to generate a first light beam to illuminate the reflective data medium; and a transparent illuminator configured to generate a second light beam to illuminate the transparent data medium, whereby the transparent illuminator is also configured to provide a white reference signal for use in calibrating the dual digitizer for digitizing the reflective data medium when the transparent illuminator is off.

Another dual digitizer configured to digitize a data medium consistent with the invention includes: a transparent illuminator configured to generate a first light beam to illuminate a transparent medium; a reflective illuminator configured to generate a second light beam to illuminate a reflective medium; a light sensitive element configured to accept the first light beam or the second light beam and convert the first light beam and the second light beam into an analog signal representative of data recorded on the transparent data medium or the reflective data medium; and electronic processing circuitry configured to accept the analog signal and provide a digital signal representative of the data recorded on the transparent data medium or the reflective data medium, wherein the transparent illuminator is configured to reflect a first portion of the second light beam from the reflective illuminator when the transparent illuminator is off, the first portion of the second light beam providing a white reference signal for use in calibrating the dual digitizer for digitizing the reflective data medium.

A method of calibrating a dual digitizer configured to digitize a data medium, the data medium being a transparent data medium or a reflective data medium, the method consistent with the invention including the steps of: generating a light beam; and reflecting a portion of the light beam with a transparent illuminator, wherein the portion of the light beam establishes a white calibration reference signal.

Another method of digitizing a data medium consistent with the invention includes the steps of: digitizing a transparent data medium; calibrating the dual digitizer to establish a white reference signal, the calibrating step including generating a light beam, reflecting a first portion of the light beam off a transparent illuminator, and utilizing the first portion of the light beam to establish the white reference signal; and digitizing a reflective data medium.

BRIEF DESCRIPTION OF THE DRAWINGS

Advantages of the present invention will be apparent from the following detailed description of exemplary embodiments thereof, which description should be considered in conjunction with the accompanying drawings, in which.

DETAILED DESCRIPTION

Figure 1:
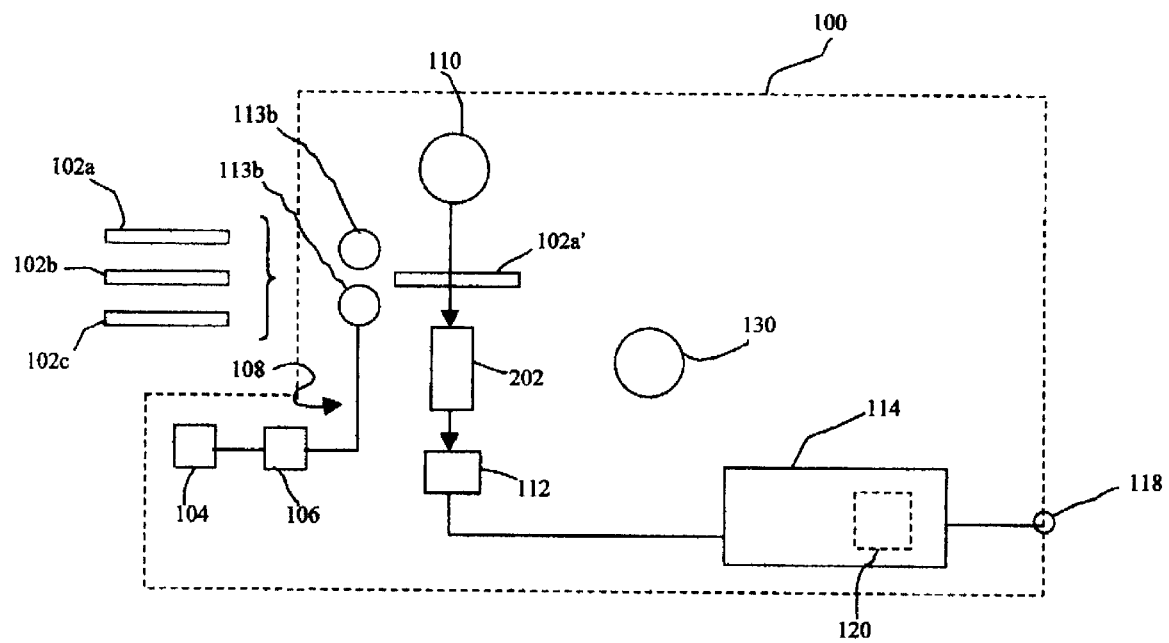
FIG. 1 is a block diagram of a dual digitizer with the transparent illuminator and reflective illuminator positioned to provide, among their other functions, a white reference calibration signal consistent with the invention.

FIG. 1 illustrates a simplified block diagram of a dual digitizer 100 capable of digitizing both a transparent data medium 102a and a reflective data medium 102b. In general, digitizing is the process of converting optical densities of an image on a medium, e.g., a transparent data medium 102a or reflective data medium 102b, to electrical signals that represent various intensities of transmitted light and thus densities of the data on the applicable medium.

In digitizing the transparent data medium 102a, the medium 102a may first be inserted into the digitizer 100 and accepted by a transport control system 108, which also may provide motive force to move the medium 102a through the digitizer 100. The transparent medium 102a may be any varieties of transparent medium known in the art such as an x-ray film utilized in a medical application.

The film transport control system 108 may further include a motor 104 coupled to an associated gear train 106 to provide such motive force. The transport control system 108 may further include rollers 113a, 113b to impart force to the transparent data medium 102a. Those skilled in the art will recognize a variety of transport control systems 108 that may be employed in a dual digitizer consistent with the present invention.

The transport control system 108 provides the motive force to position the transparent data medium 102a in a position 102a' to be scanned. Alternatively, a platen or flat bed type digitizer having no transport control system to move the data medium, but rather having a movable imaging apparatus, may be utilized. In either case, light from a transparent illuminator 110 passes through the transparent data medium 102a and is measured by a light sensitive element 112. A lens 202 may also be used to direct the light towards the light sensitive element 112. A separate reflective illuminator 130 is used to provide illumination for digitizing a reflective data medium 102b.

The light sensitive element 112 accumulates photons and converts such photons into an analog electrical signal representative of the accumulated photons. The light sensitive element 112 may by a variety of elements known in the art such as a charge coupled device (CCD) array or a CMOS array. The light sensitive element 112 may be in the form of a line, square, rectangle, or any various shape such that the whole transparent data medium 102a may be virtually divided into areas and every area corresponds to an analog signal that represents the amount of light transmitted through that area.

In this manner, an analog image signal may be obtained which represents the whole image recorded on the transparent data medium 102a. The analog image is then processed by electronic processing circuitry 114. The electronic processing circuitry 114 may include a variety of devices known in the art including an analog to digital converter 120 for converting the analog signal into a digital signal. As such a digital image signal may be output to terminal 118 for further electronic use, e.g., electronic storage, processing, and communication.

Figure 2:
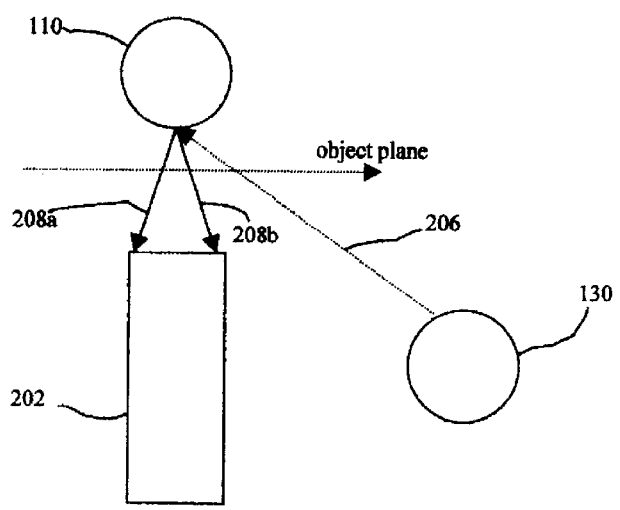
FIG. 2 is a more detailed block diagram of the transparent illuminator and reflective illuminator positioning illustrating various light beams used in white reference calibration.

Turning to FIG. 2, a more detailed block diagram of the transparent illuminator 110 and reflective illuminator 130 positioning illustrating various light beams is illustrated. As illustrated, the transparent illuminator 110, the reflective illuminator 130, or both are advantageously positioned to enable the transparent illuminator 110 to act, not only as the illuminator for the transparent data medium 102a, but also as a reflector for providing a white reference signal for reflective calibration. When no data medium is being fed through the digitizer 100 and the transparent illuminator 110 is off, the reflective illuminator 130 may produce a light beam 206 that is directed towards the transparent illuminator 110.

A plurality of reflected light beams 208a, 208b, which are a portion of the light beam 206 are reflected by the transparent illuminator 110 depending on the reflectivity of the transparent illuminator. In one embodiment, the transparent illuminator 110 may be a fluorescent lamp. As such, the diffuse white fluorescent lamp provides suitable reflectivity to permit reflected light beams 208a, 208b to be directed back towards the lens 202 which are further directed towards the light sensitive element. Other types of lamps known in the art may also provide suitable reflection. The reflected light beams 208a, 208b may be used as a reference white signal thus eliminating the need for a separate white calibrating sheet before reflective scanning.

Because the reflected light beams 208a, 208b may not be the same magnitude as that reflected from a separate white data medium 102c, a comparison may be made between the reflectance of the transparent illuminator 110 and that of a white data medium 102c. When a ratio based on this comparison is established, it may be used thereafter to establish a reference value for the transparent illuminator 110. For instance, Wrs=reference signal from a white data medium when illuminated by the reflective illuminator 130, e.g., during factory calibration TIrs=reference signal from the transparent illuminator 110 when illuminated by the reflective illuminator 130

F=TIrs/Wrs

Therefore, TIrs may be established prior to digitizing a reflective data medium 102b and TIrs may be used for calibration. Since Wrs=TIrs/F and both TIrs and F are known, the required reference has been established. The reference signal Wrs may be set once, e.g., during factory calibration, thus eliminating the need for additionally setting of the reference signal and any repetitive insertion of the white data medium 102c.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention as defined in the appended claims.

What is claimed is:

1. A dual digitizer configured to digitize a data medium, said data medium being a transparent data medium or a reflective data medium, said digitizer comprising:

a reflective illuminator configured to generate a first light beam to illuminate said reflective data medium; and a transparent illuminator configured to generate a second light beam to illuminate said transparent data medium, whereby said transparent illuminator is also configured to provide a white reference signal for use in calibrating said dual digitizer for digitizing said reflective data medium when said transparent illuminator is off.

2. The dual digitizer of claim 1, wherein said second light beam from said reflective illuminator is directed towards said transparent illuminator, and a portion of said second light beam is reflected by said transparent illuminator, said portion of said second light beam providing said white reference signal.

3. The dual digitizer of claim 2, wherein said portion of said second light beam is compared to a second portion of said second light beam from said reflective illuminator as reflected by a white reference media to develop a calibration factor.

4. The dual digitizer of claim 3, wherein said calibration factor is said second portion of said second light beam from said reflective illuminator as reflected by said white reference media divided by said portion of said second light beam from said reflective illuminator as reflected by said transparent illuminator.

5. The dual digitizer of claim 1, wherein said transparent data medium is an x-ray film utilized in medical applications.

6. A dual digitizer configured to digitize a data medium, said data medium being a transparent data medium or a reflective data medium, said dual digitizer comprising:

a transparent illuminator configured to generate a first light beam to illuminate said transparent medium;

a reflective illuminator configured to generate a second light beam to illuminate said reflective medium;

a light sensitive element configured to accept said first light beam or said second light beam and convert said first light beam and said second light beam into an analog signal representative of data recorded on said transparent data medium or said reflective data medium; and electronic processing circuitry configured to accept said analog signal and provide a digital signal representative of said data recorded on said transparent data medium or said reflective data medium, wherein said transparent illuminator is configured to reflect a first portion of said second light beam from said reflective illuminator when said transparent illuminator is off, said first portion of said second light beam providing a white reference signal for use in calibrating said dual digitizer for digitizing said reflective data medium.

7. The dual digitizer of claim 6, wherein said first portion of said second light beam is compared to a second portion of said second light beam, said second portion of said light beam being a portion of said second light beam from said reflective illuminator as reflected by a white media sheet.

8. The dual digitizer of claim 7, wherein said calibration factor is said second portion of said second light beam divided by said first portion of said second light beam.

9. The dual digitizer of claim 6, wherein said transparent data medium is an x-ray film utilized in medical applications.

10. The dual digitizer of claim 6, wherein said transparent illuminator comprises a fluorescent lamp.

11. A method of calibrating a dual digitizer configured to digitize a data medium, said data medium being a transparent data medium or a reflective data medium, said method comprising the steps of:

generating a light beam; and refecting a portion of said light beam OFF a transparent illuminator wherein said portion of said light beam establishes a white calibration reference signal.

12. The method of claim 11, wherein said light beam originates from a reflective illuminator.

13. The method of claim 11, wherein said method further comprises:

reflecting a second portion of said light beam with a white reference sheet; and establishing a calibration factor by comparing said portion of said light beam with said second portion of said light beam.

14. The method of claim 11, wherein said calibration factor is an intensity of said second portion of said light beam divided by an intensity of said first portion of said light beam.

15. A method of digitizing a data medium comprising the steps of:

digitizing a transparent data medium;

calibrating said dual digitizer to establish a white reference signal, said calibrating step comprising generating a light beam, reflecting a first portion of said light beam off a transparent illuminator, and utilizing said first portion of said light beam to establish said white reference signal; and digitizing a reflective data medium.

16. The method of claim 15, wherein said calibrating step further comprises the steps of:

establishing a calibration factor by comparing said first portion of said light beam with a second portion of said light beam as reflected off a white calibration sheet.

17. The method of claim 16, wherein said calibration factor is an intensity of said second portion of said light beam divided by an intensity of said first portion of said light beam.

18. The method of claim 15, wherein said transparent data medium is an x-ray film utilized in medical applications.

* * * * *